United States Patent
Martin et al.

(10) Patent No.: US 6,795,874 B2
(45) Date of Patent: Sep. 21, 2004

(54) DIRECT MEMORY ACCESSING

(75) Inventors: Gregor J. Martin, Sunnyvale, CA (US); David N. Pether, Wokingham (GB); Kalvin Williams, Thatcham (GB)

(73) Assignee: LSI Logic Corporation, Milpitas, CA (US)

(*) Notice: Subject to any disclaimer, the term of this patent is extended or adjusted under 35 U.S.C. 154(b) by 506 days.

(21) Appl. No.: 09/836,075

(22) Filed: Apr. 16, 2001

(65) Prior Publication Data

US 2002/0099880 A1 Jul. 25, 2002

(51) Int. Cl.$^7$ ............................................. G06F 13/00
(52) U.S. Cl. .............................. 710/20; 710/6; 710/7; 710/21; 710/22; 710/33; 710/36
(58) Field of Search .......................... 710/4, 7, 20, 21, 710/22, 33, 36

(56) References Cited

U.S. PATENT DOCUMENTS

| | | | |
|---|---|---|---|
| 4,467,454 A | | 8/1984 | Kurosu et al. ............... 365/189 |
| 4,475,155 A | | 10/1984 | Oishi et al. .................. 364/200 |
| 4,722,051 A | | 1/1988 | Chattopadhya ............. 364/200 |
| 5,274,795 A | | 12/1993 | Vachon ........................ 395/500 |
| 5,444,858 A | * | 8/1995 | Wakerly ...................... 713/600 |
| 5,634,042 A | * | 5/1997 | Kashiwagi et al. .......... 713/501 |
| 6,230,241 B1 | * | 5/2001 | McKenney .................. 711/118 |
| 6,260,082 B1 | * | 7/2001 | Barry et al. .................. 710/22 |
| 6,611,895 B1 | * | 8/2003 | Krull et al. .................. 711/113 |

OTHER PUBLICATIONS

"Multi–Channel DMA with Scheduled Ports", Laurent Six, et al., Dec. 13, 2000, European Patent Application publication EP 1 059 589 A1.

"Vorrichtung zur Mikroprogramm–Steuerung eines Informationstransfers und Verfahren zu ihrem Betrieb", Hans Stadlmeier, et al., May 15, 1984, European Patent Application publication EP 0 108 418 A2.

* cited by examiner

Primary Examiner—Fritz Fleming
Assistant Examiner—Mohammad O. Farooq
(74) Attorney, Agent, or Firm—Christopher P. Maiorana, P.C.

(57) ABSTRACT

A method of performing data shifts in a data processing system between a source and a plurality of destinations using a direct memory accessing scheme, comprising the steps of: (A) reading a data block from the source destinations; (B) writing the data block to a first of the plurality of destinations; and (C) writing the data block to a second of the plurality of destinations. Addresses of the first and second destinations are previously stored.

22 Claims, 2 Drawing Sheets

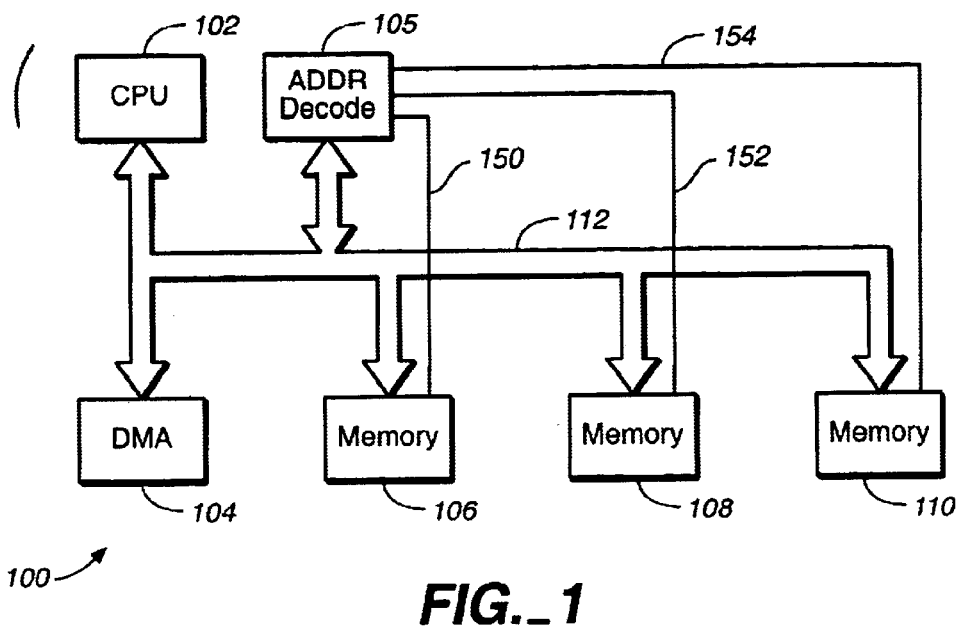
FIG._1
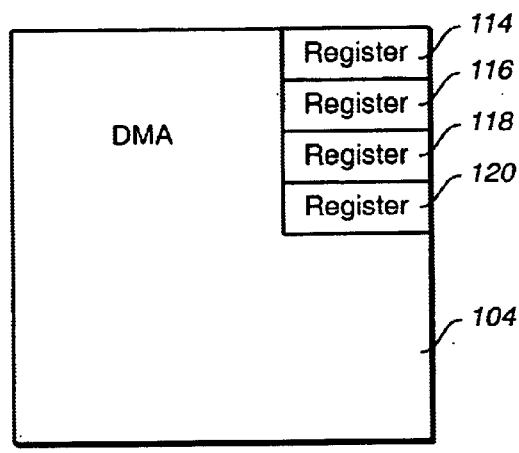
FIG._2

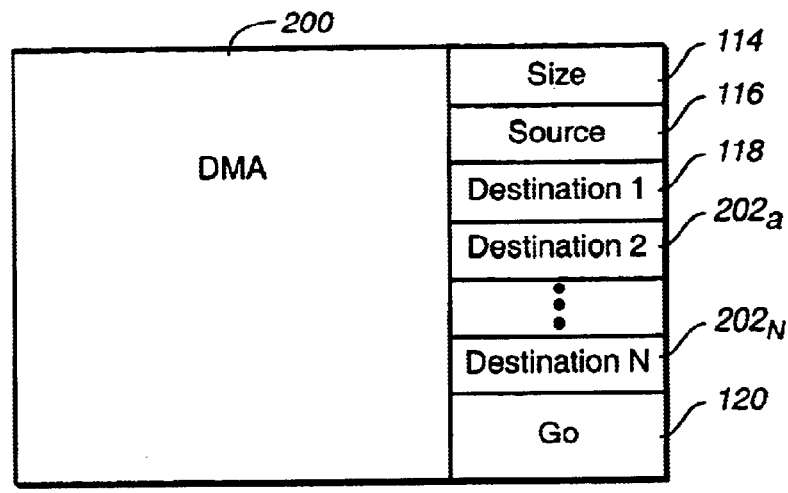
FIG._3
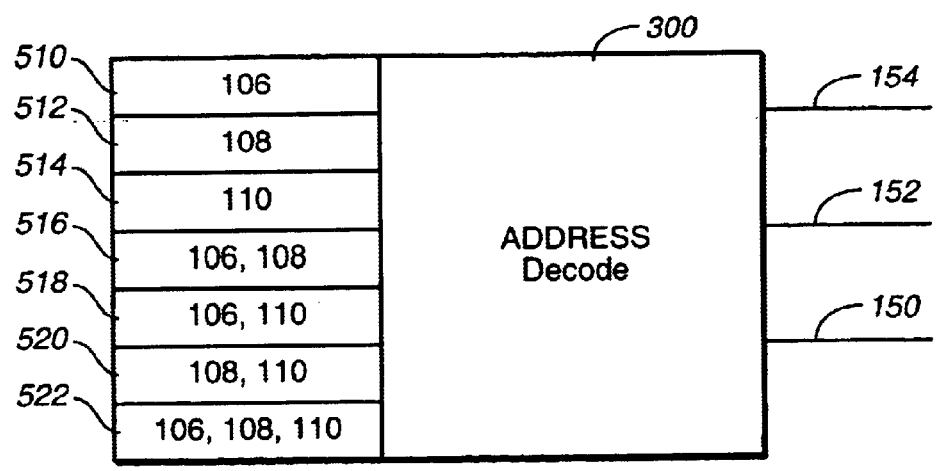
FIG._4

DIRECT MEMORY ACCESSING

This application claims the benefit of United Kingdom Application No. 0101399.4 filed Jan. 19, 2001.

FIELD OF THE INVENTION

The present invention relates to Direct Memory Accessing (DMA) in a data processing system generally, and more particularly, to a method and apparatus for performing single to multiple data shifts in a data processing system.

BACKGROUND OF THE INVENTION

Direct Memory Access (DMA) engines are known in the art and are implemented to automate the process of shifting data around a data bus. For example, DMA engines shift data between different memories within a data processing system without the intervention of the system processor (CPU). DMA engines eliminate the requirement for the CPU to perform each bus transaction (i.e., the movement of blocks of data from one location to another across the system bus). Therefore, DMA engines are implemented in a majority of microprocessor based data processing systems.

Conventional DMA technologies do not efficiently copy a set of data from one source to two or more destinations. Such an operation is required for MPEG video decoding systems, where video data is both processed and analyzed simultaneously. The processing and analysis cannot be carried out by the same processing block, therefore the data is required to be simultaneously copied to first and second processing blocks for data processing and analysis. Thus, two copies of the set of data are required to be operated upon in parallel in two distinct processing blocks. Although conventional DMA engines can be used to transfer such data to both processing blocks, the ability of conventional DMA engines to make multiple copies is inefficient. The duplication can only be achieved sequentially and not simultaneously, which introduces delays to the system. Conventional DMA engines are required to be set up and executed twice to copy one set of data to two locations. Thus, if a data processing system requires a block of data to be copied from a memory location (X) to both memory locations (Y) and (Z), the procedure for a conventional DMA engine is:

Read data from memory location X;
Write data to memory location Y;
Read data from memory location X;
Write data to memory location Z.

It will be appreciated that the above procedure is wasteful of bandwidth, since it is necessary to read from memory location X twice. Moreover, the system CPU is required to set up and execute the DMA engine separately for each destination memory location.

SUMMARY OF THE INVENTION

The present invention concerns a method of performing data shifts in a data processing system between a source and a plurality of destinations using a direct memory accessing scheme, comprising the steps of: (A) reading a data block from the source destinations; (B) writing the data block to a first of the plurality of destinations; and (C) writing the data block to a second of the plurality of destinations. Addresses of the first and second destinations are previously stored.

The steps of writing the data to the first and second destinations may be carried out sequentially or simultaneously. Additionally, the present invention may efficiently shift blocks of data around a data bus between memory locations.

Objects, features and advantages of the present invention include providing a method and/or apparatus for shifting blocks of data around a data bus between memory locations.

BRIEF DESCRIPTION OF THE DRAWINGS

These and other objects, features and advantages of the present invention will be apparent from the following detailed description and the appended claims and drawings in which:

FIG. 1 is a block diagram of a data processing system incorporating a DMA engine;

FIG. 2 is a block diagram of a DMA engine;

FIG. 3 is a block diagram of a DMA engine implementing a preferred embodiment of the present invention; and FIG. 4 is a block diagram of a preferred form of a data address decoder for use with the DMA engine of FIG. 3.

DETAILED DESCRIPTION OF THE PREFERRED EMBODIMENTS

Referring to FIG. 1, a block diagram of a data processing system 100 is shown. The data processing system may include a CPU 102, a DMA engine 104, an address decoder 105 and three system memory locations (or slaves) 106, 108, and 110. The CPU 102, the DMA 104 and the address decoder 105 may be connected to each other and to each of the slaves 106, 108, and 110 via a system bus 112. In addition, the address decoder 105 may be connected to each slave by a respective read/write enable line 150, 152, and 154.

FIG. 2 is a detailed block diagram of the DMA 104 of FIG. 1. The DMA contains a number of registers 114, 116, 118 and 120. The register 114 may be implemented as a size register. The size register 114 may contain data setting the number of data transfers the DMA 104 is to perform. The register 116 may be implemented as a source address register. The source address register 116 may hold the source address of the data to be copied. The register 118 may be implemented as a destination register. The destination register 118 may hold the destination address of the memory to which the data is to be copied. The register 120 may be implemented as an indication register. The indication register 120 may be a single bit register which, when set to 1 by the CPU 102, instructs the DMA 104 to begin the data transfer.

In a particular example, four blocks of data are to be copied from the slave 106 to the slaves 108 and 110. The CPU 102 may write the binary value 100 to the register 114. The register 114 may indicate that four blocks of data are to be copied. The CPU 102 may then write the source start address (e.g., the first address of the data in the slave 106 to be copied to the slaves 108 and 110) to the register 116 and the destination start address (e.g., the address in the slave 108 to which the data is to be copied) to the register 118. Once the registers 106,108 and 110 are setup, the CPU 102 may write the value 1 to the register 120. The register 120 via the value 1 may then instruct the DMA 104 to begin the data transfer.

The source start address held in the register 116 may be sent by the DMA 104 to the address decoder 105. The address decoder 105 may contain a direct 1:1 mapping of the addresses in the slaves 106, 108, and 110. Additionally, the address decoder 105 may set the read/write status of the slave 106 to enabled via the enable line 150 on receipt of the source start address. The DMA 104 may then read the first block of data from the slave 106. Next, the destination start address held in the register 118 may be sent by the DMA 104 to the address decoder 105. The address decoder 105 may set the read/write status of the slave 108 to enabled via the enable line 152. The first block of data may then be written to the slave 108.

The source start address held in the register 116 may then be then sent to the address decoder 105. The address decoder 105 may then set the read/write status of the slave 106 to enabled via the enable line 150. The DMA 104 may then read the second block of data from the slave 106. The destination start address held in the register 118 may then be sent to the address decoder 105. The address decoder 105 may set the read/write status of the slave 108 to enabled via the enable line 152 and the second block of data is generally copied to the next address in the slave 108. The process is generally repeated for the third and fourth blocks of data. Since the size register is set at four (to indicated four blocks of data to be copied) the copying of the blocks to the slave 108 may be achieved. The sequence may be repeated to copy the data to the slave 110. However, the CPU 102 may update the register 118 to indicate the address of the slave 110 (as previously described). The value 1 may then be sent to the register 120 to instruct the DMA 104 to begin copying the first block of data from the slave 106 to the slave 110.

The above description applies to the situation where the slave is formed by a single address-port device. However, it will be apparent to those skilled in the art that if a slave is formed by a region of memory rather than a single address-port device then the DMA 104 may increment the destination address each time a block of data is read or written. Since the address decoder 105 contains a 1:1 mapping of the slaves 106, 108, and 110, one slave location may be read/write enabled at any given moment. Additionally, a data block read from the source slave is temporarily stored in the DMA 104 until the read/write status of the destination slave is enabled.

The sequence of events during such a transfer as described may be as follows:

$R_{106}1, W_{108}1, R_{106}2, W_{108}2, R_{106}3, W_{108}3, R_{106}4, W_{108}4, R_{106}1, W_{110}1, R_{106}2, W_{110}2, R_{106}3, W_{110}3, R_{106}4, W_{110}4$, where:

R=Read;
W=Write;
106=the source slave;
108=the first destination slave;
110=the second destination slave.

It will be appreciated that the copying of four blocks of data from the slave 106 to the slaves 108 and 110 involves sixteen steps on the part of the DMA 104 and two setup steps on the part of the CPU 102. Consider the DMA 104 alone:

N=2*DS, where:
N=the number of slave accesses required;
D=the number of destination slaves;
S=the size value (e.g., the number of blocks of data to be transferred).

Referring to FIG. 3, to a preferred form of a DMA engine 200 of the present invention is shown. The DMA engine 200 may enable the two copying steps to be carried out more efficiently and quickly. The DMA engine 200 may have additional destination registers 202a–202n to store the address of the second (or more) slaves 110. It will be appreciated that a destination address register is required in the DMA engine 200 for each destination slave. Thus, if the data is to be copied to four different slaves then four destination address registers 202a, 202b, 202c and 202n may be required in the DMA engine 200. The DMA engine 200 is shown having N, where N is an integer, destination address registers 202a to 202n for copying data to N slaves.

In one example, four blocks of data may need to be copied from the slave 106 to the slaves 108 and 110. The CPU 102 may write the binary value 100 to the register 114 indicating that four blocks of data are to be copied. The CPU 102 may then write the source start address (e.g., the first address of the data in the slave 106 to be copied to the slaves 108 and 110) to the register 116. The CPU 102 may then write the first destination start address (e.g., the address in the slave 108 to which the data is to be copied) to the register 118 and the second destination start address (e.g., the address in the slave 110 to which the data is to be copied) to the register 202a. Once the registers 106, 108, 110 and 202a are set up, the CPU 102 may write the value 1 to the register 120 to instruct the DMA 200 to begin the data transfer.

The source start address held in the register 116 may be sent via the DMA 200 to the address decoder 105. On receipt of the source start address, the address decoder 105 may set the read/write status of the slave 106 to enabled. Then, the DMA 200 may read the first block of data from the slave 106 as determined by the source start address held in the register 116. The first block of data may be temporarily stored in the DMA 200 while the first destination start address held in the register 118 may be sent via the DMA 200 to the address decoder 105. The address decoder 105 may then set the read/write status of the slave 108 to enabled. The first block of data may then be written to the slave 108. Next, the second destination start address may be sent by the DMA 200 to the address decoder 105 to set the read/write status of the slave 110 to enabled. The first block of data may then be written to the slave 110 as determined by the second destination start address held in the register 202a–202n.

The source start address held in the register 118 may then be sent by the DMA 200 to the address decoder 105. The address decoder 105 may set the read/write status of the slave 108 to enabled and the DMA 200 may then read the second block of data from the slave 106 which is temporarily stored in the 200. The first destination start address held in the register 118 may be sent by the DMA 200 to the address decoder 105 to set the read/write status of the slave 108 to enabled. The DMA 200 may then copy the second block of data to the slave 108. The DMA 200 may then send the second destination start address held in the register 202a–202n to the address decoder 105 to set the read/write status of the slave 110 to enabled. The second block of data may then be copied to the slave 110. The process may be repeated for the third and fourth blocks of data. Since the size register 114 is set at four to indicate four blocks of data to be copied, the copying of those blocks to the slaves 108 and 110 may be achieved.

The above description of operation of the preferred embodiment of the invention applies to the situation where the slave is formed by a single address-port device. However, it will be apparent to those skilled in the art that if a slave is formed by a region of memory rather than a single address-port device the DMA 200 may increment the source/destination address each time a block of data is read or written.

The sequence of events during such a transfer may be as follows:

$R_{106}1, W_{108}1, W_{110}1, R_{106}2, W_{108}2, W_{110}2, R_{106}3, W_{108}3, W_{110}3, R_{106}4, W_{108}4, W_{110}4$, where:

R=Read;
W=Write;
106=the source slave;

108=the first destination slave;

110=the second destination slave.

It will be appreciated that the copying of four blocks of data from the slave 106 to the slaves 108 and 110 may involve twelve steps on the part of the DMA 200 and one set up step on the part of the CPU 102. Consider the DMA 200 alone:

N=S+D*S, where:

N=the number of slave accesses required;

D=the number of destination slaves;

S=the size value (e.g., the number of blocks of data to be transferred).

Thus, in carrying out the above data transfer, the DMA 200 may read the first block of data from the slave 106 and write the block of data to the slave 108 using the first destination address held in the register 118 and then to the slave 110 using the second destination address held in register 202a–202n. It will be appreciated that the DMA 200 of the present invention may require one read access for every data block transferred regardless of the number of destinations the data block is to be written to. As a consequence, the number of memory accesses required may be reduced by:

DS–S

In the above example, the present invention may provide a bandwidth saving of 25%. It will be appreciated by those skilled in the art that many systems do not provide the address decoder 105. In such implementation, the DMA 200 may output the address onto the bus 112 to be received by each of the slaves 106, 108, 110. Each of the slaves 106, 108 and 110 generally comprise address decoding circuitry which reads the address. The slave to which the address applies may be simply read/write status enabled. The DMA 200 may also send a read or write signal in dependence on the operation being a data read or data write. The signal may be received by the active slave which performs the appropriate operation (e.g., send the data block to the DMA 200 for a read operation or writes the data block to memory for a write operation).

A further improvement in the speed of data transfer of the present invention may be achieved by the DMA 200 by a modification of the address decoder 105 of FIG. 1. The address decoder 105 may contain a direct 1:1 mapping of the addresses of the slaves 106, 108, 110. Thus, a single slave may be read/write enabled at any one time. It can been seen that data writes to the slaves are thus sequential and not simultaneous.

Referring to FIG. 4, an improved address decoder 300 of the present invention is shown. To enable simultaneous transfer of data blocks by the DMA 200, the address decoder 300 may provide an area of memory which is mapped to one or more virtual addresses 510–522. The virtual address may represent the addresses of a combination of the slaves 106, 108, and 110. For example, if data is to be copied from the slave 106 to the slaves 108 and 110, after reading the data from the slave 106 the DMA 200 may identify the destination slaves from the first and second destination start addresses stored in the registers 118, 202a–202n and send the virtual address 520 to the address decoder 300. The virtual address 520 may instruct the address decoder 300 to enable the read/write status of the slaves 108 and 110. With the write status of the slaves 108 and 110 enabled, the DMA 200 may write the data block to both slaves simultaneously. Such an implementation may be utilized for high speed single to multiple data transfers, since a significant speed improvement may be obtained. It will be appreciated that a virtual address is generally required for every combination of two or more destination slaves in order for the address decoder 300 to determine which of the enable lines 150–154 to set. It will also be appreciated that the virtual addresses cannot be used during a read procedure and are only applicable to data writes. The address decoder 300 may be applicable to data processing systems where both the system processor 102 and the DMA 200 are used for data transfer.

Moreover, it is possible that the above described address decoder 300 may be used with the DMA 104 having only one destination register. In such an implementation, the copying of data from the slave 106 to the slaves 108 and 110 may be achieved by the CPU 102 writing the address 520 to the single destination register in the DMA 104. The virtual address 520 may then be passed to the address decoder 300 for decoding. The present invention (including the address decoder 300) may reduce the number of memory accesses by a further 25%. Thus, the present invention may be twice as fast as conventional DMA data transfer. It will be appreciated that the present invention may be used in a bus system having two-way hand shaking between the CPU/DMA and the slaves, since the acknowledgement signal is provided on a separate signal path for each slave. In addition the acknowledgement signals may be required to be routed through the address decoder to combine the signals using an AND function to provide a single acknowledgement signal for the CPU/DMA. It will be appreciated that the present invention may provide increased DMA performance for data transfer and reduce the requirement for intervention by the system CPU. Therefore, the present invention may further increases system performance.

While the invention has been particularly shown and described with reference to the preferred embodiments thereof, it will be understood by those skilled in the art that various changes in form and details may be made without departing from the spirit and scope of the invention.

What is claimed is:

1. A method of performing data shifts between a source and a plurality of destinations, comprising the steps of:
   (A) reading a first data block of at least one data block across a bus from said source as part of a direct memory access operation;
   (B) writing said first data block across said bus to a first of said plurality of destinations as part of said direct memory access operation; and
   (C) writing said first data block across said bus to a second of said plurality of destinations as part of said direct memory access operation without rereading said first data block from said source, wherein a first address of said first destination and a second address of said second destination are stored prior to performing said data shifts.

2. The method according to claim 1, further comprising the step of:
   repeating steps (A) to (C) for each succeeding data block of said at least one data block at said source being transferred during said direct memory access operation.

3. The method of claim 2, further comprising the steps of:
   writing a data block number to set a number of said at least one data block to be transferred;
   writing a start address of said first data block in said source; and
   beginning said data shifts.

4. The method of claim 1, wherein steps (B) and (C) are carried out sequentially.

5. The method of claim 1, wherein steps (B) and (C) are carried out simultaneously.

6. The method of claim 1, wherein said source and each of said plurality of destinations are memory locations.

7. The method of claim 1, wherein said source and each of said plurality of destinations are memory locations containing blocks of data to be shifted on said bus.

8. The method of claim 1, wherein a first number of read operations to transfer a plurality of blocks of said at least one data block from said source to said destinations is less than a second number of said destinations.

9. The method according to claim 1, wherein each of steps (B) and (C) further comprise the sub-step of:

mapping a write address for said first data block to at least one of a plurality of enable signals each corresponding to one of said destinations.

10. The method according to claim 9, wherein said write address is mapped to at least two of said enable signals corresponding to at least said first destination and said second destination.

11. The method according to claim 1, further comprising the step of:

writing a data block number to set a number of said at least one data block to be transferred prior to starting said direct memory access operation.

12. The method according to claim 1, further comprising the step of:

writing a start address of said first data block in said source prior to starting said direct memory access operation.

13. A DMA engine comprising:

a source register for storing an address of a source for a first data block of at least one data block stored at said source;

a first destination register for storing a first address of a first destination of a plurality of destinations; and a second destination register for storing a second address of a second destination of said destinations, wherein said DMA engine is configured to (i) read said first data block across a bus once from said source in response to said address stored in said source register and (ii) write said first data block across said bus to both said first and said second destinations in response to both of said first and said second addresses stored in said first and said second destination registers as part of a direct memory access operation.

14. The DMA engine according to claim 13, wherein said DMA engine is further configured to write said first data block sequentially to said first and said second destinations.

15. The DMA engine according to claim 13, wherein said DMA engine is further configured to write said first data block simultaneously to both said first and said second destinations.

16. The DMA engine according to claim 13, further comprising a plurality of second destination registers for storing a plurality of addresses corresponding to said destinations.

17. The DMA engine according to claim 13, further comprising:

a size register for storing a value representative of a number of blocks of said at least one data block to be transferred during said direct memory access operation.

18. A data processing system comprising:

a processor;

a DMA engine;

a first location;

a plurality of second locations; and a bus connecting said processor, said DMA engine, said first location and said second locations, wherein said DMA engine includes (i) a first register for storing a first address determined by said processor for said first location, (ii) a second register for storing a second address determined by said processor for at least one of said second locations, and (iii) a third register for storing a third address determined by said processor for at least another one of said second locations, wherein said DMA engine is arranged to (a) read data from said first location in response to said first address stored in said first register and (b) write data to both of said at least one and said at least another one of said second locations in response to at least one of said second and said third addresses stored in said second and said third registers during a direct memory access operation.

19. The data processing system according to claim 18, wherein said DMA engine is further configured to write said data sequentially to said at least one and said at least another one of said second locations.

20. The data processing system according to claim 18, wherein said DMA engine is further configured to write said data simultaneously to said at least one and said at least another one of said second one or more locations.

21. The data processing system according to claim 18, further comprising an address decoder coupled to said bus and arranged for enabling a read/write status of at least one of said second locations in dependence on at least one of said second address and said third address.

22. The data processing system according to claim 21, wherein said address decoder is provided with a plurality of memory locations each representative of a combination of one or more of said second locations and configured to enable said read/write status of one or more of said second locations.

* * * * *